(12) United States Patent
Burley et al.

(10) Patent No.: US 8,040,355 B2
(45) Date of Patent: Oct. 18, 2011

(54) THREE-DIMENSIONAL LOCATION-BASED TEXTURE TRANSFERS

(75) Inventors: Brent Burley, Monterey Park, CA (US); Charles Tappan, Los Angeles, CA (US); Daniel Teece, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 665 days.

(21) Appl. No.: 12/177,674

(22) Filed: Jul. 22, 2008

(65) Prior Publication Data

US 2009/0027412 A1    Jan. 29, 2009

Related U.S. Application Data

(60) Provisional application No. 60/951,421, filed on Jul. 23, 2007.

(51) Int. Cl.
*G06T 17/00* (2006.01)
*G06T 11/40* (2006.01)
*G09G 5/00* (2006.01)
*G06K 9/36* (2006.01)
*G06K 9/32* (2006.01)
*A63F 13/00* (2006.01)

(52) U.S. Cl. ........ 345/582; 345/420; 345/428; 345/552; 345/581; 382/285; 382/293; 382/300; 463/32

(58) Field of Classification Search .......... 345/418–420, 345/428, 581, 587, 618–619, 606, 653, 545–552; 382/254, 274, 276, 285, 293, 300, 299, 305; 463/1, 31–32
See application file for complete search history.

(56) References Cited

U.S. PATENT DOCUMENTS

| | | | | |
|---|---|---|---|---|
| 5,856,829 | A * | 1/1999 | Gray et al. | 345/422 |
| 6,434,278 | B1 * | 8/2002 | Hashimoto | 382/285 |
| 2006/0017741 | A1 * | 1/2006 | Sekine et al. | 345/582 |
| 2006/0232583 | A1 * | 10/2006 | Petrov et al. | 345/419 |

* cited by examiner

*Primary Examiner* — Wesner Sajous
(74) *Attorney, Agent, or Firm* — Kilpatrick Townsend and Stockton LLP

(57) ABSTRACT

Textures are transferred between different object models using a point cloud. In a first phase, a point cloud in 3-D space is created to represent a texture map as applied to a first, or "source," object model. In a second phase, a value for a target texel of a texture map associated with a second, or "target," object model, is determined by identifying the 3-D location on a surface defined by the target object model that maps to the location of the target texel and assigning a value based on the nearest point (or points) to that location in the 3-D point cloud. To the extent that differences between the source and target object models are minor, the texture transfer can be accomplished without loss of information or manual cleanup.

41 Claims, 4 Drawing Sheets

THREE-DIMENSIONAL LOCATION-BASED TEXTURE TRANSFERS

CROSS-REFERENCES TO RELATED APPLICATIONS

This application claims the benefit of U.S. Provisional Application No. 60/951,421, filed Jul. 23, 2007, entitled "Three-Dimensional Location-Based Texture Transfers," which disclosure is incorporated herein by reference for all purposes.

BACKGROUND OF THE INVENTION

The present invention relates in general to computer-based image generation and in particular to transferring textures from one surface to another based on three-dimensional location information.

Computer-based image generation is frequently used to produce animated movies. The characters and other objects that will appear in the movie can be defined as three-dimensional ("3-D") models that can be placed at various positions within a scene. Generally, the models for characters (and other movable objects) provide enough information to allow the character to be shown from any angle.

Modeling a character or other object usually involves defining the surface geometry (size and shape) of the character or object. Typically, the geometry is defined using one or more surfaces, where each surface is defined by a control mesh that includes a set of control vertices and rules for interpolating between the control vertices to locate other points on the surface. Each control vertex has coordinates (x, y, z) in a 3-D modeling coordinate space and is mapped to (u, v) coordinates in a "texture space"; rules for establishing such mappings are well known. The texture space is used to apply color (and other attributes) to the surface. As is generally known, a texture map associates an attribute value with (u, v) coordinates of a texel in a texture space. The texture map can be created, e.g., manually or procedurally. Multiple texture maps can be used to represent multiple attributes or in some cases perturbations to be applied to attributes. When the object is rendered, the rendering algorithm uses the texture mapping to determine the (u, v) texture coordinates associated with a point on the object's surface, then uses the texture coordinates to select a corresponding texel from the texture map. Texture coordinates for arbitrary points on an object's surface are usually determined by interpolation between the texture coordinates associated with neighboring control vertices. In some cases, multiple texels may be read and blended, or filtered, rather than using a single texel per point.

During the course of creating an animated movie, the texture and/or the object geometry of various objects appearing in the movie might both be changed. For instance, models of characters in the movie often undergo many changes (e.g., for esthetic effect) as the production progresses. Thus, it might be decided that a character's eyes should be larger or smaller in relation to his face, then later that a surface feature (e.g., a chin cleft) should be added to the face, and later still that the character should be taller or thinner. Dozens of changes can be expected in the course of developing the important characters in an animated movie.

Changing the geometry of a character or other object usually requires changes in the texture map(s) associated with the object. For instance, changes in the geometry usually include changing the control vertices, e.g., by adding new control vertices, deleting old control vertices, and/or shifting control vertices points to new positions. The mapping of control vertices to texture space coordinates is determined by the geometry, and modifying the control vertices may result in changes in the texture mapping. (Sometimes, even a seemingly small modification to the control vertices can result in a large change in the texture mapping.) If the texture information is not properly transferred from the original texture map to a new texture map associated with the modified model, undesirable distortion can result.

Existing techniques for transferring textures from old geometry to new geometry are time-consuming. One such technique entails manually re-painting the texture onto the modified object. This process is tedious and time-consuming. Another technique uses 2-D projections of the rendered object to at least partially automate the texture transfer. In this technique, a 2-D image of the original object is rendered from each of six orthographic projections. These rendered images are then projected, from appropriate directions, onto the modified object. The projections are used to populate a texture map associated with the modified object. This projection technique can save a significant amount of time as compared to manual re-painting, particularly for any portions of the object where geometry was not changed. However, projection techniques have other drawbacks. For instance, for a character with limbs (e.g., arms and legs), portions of the limbs will likely be occluded, or other portions of the body will be occluded by the limbs. Texture information for occluded portions of the object is lost in projection and must be manually re-created. In addition, distortion can result, e.g., if a surface of the object is oriented at an angle to the optical axis of the projection. Consequently, texture transfers can be accelerated using 2-D projections but often end up requiring extensive manual cleanup.

It would therefore be desirable to provide improved techniques for transferring textures between different versions of object geometry.

BRIEF SUMMARY OF THE INVENTION

Embodiments of the present invention provide systems and methods for transferring textures between different object models using a point cloud. In a first phase, a point cloud in 3-D space is created to represent a texture map as applied to a first, or "source," object model. In some embodiments, the point cloud has the property that each texel of the texture map is represented by a point in the point cloud; for each texel, a corresponding location on a surface in 3-D space defined by the source object model is identified, and the point cloud point has the coordinates of the corresponding location and the attribute value of the texel. An attribute value for a target texel of a texture map associated with a second, or "target," object model, is determined by identifying the 3-D location on a surface defined by the target object model that maps to the texture-space coordinates of the target texel and assigning an attribute value to the target texel based on the attribute value of the nearest point (or points) to that location in the 3-D point cloud. In this manner, a texture map for the target object model can be automatically populated with texel values. To the extent that differences between the source and target object models are minor (e.g., adding detail or making small modifications to the shape), the texture transfer can be accomplished without loss of information or manual cleanup.

Where differences between the source and target object models are larger, it is possible to perform intermediate modifications so that the point cloud will better register with the target model. For example, if an object is being stretched (or compressed) in a particular direction in the target model, the point cloud can also be stretched (or compressed) in that direction before the texels associated with the target model are matched to points in the point cloud. Alternatively, the target model can be temporarily deformed to more closely match the shape of the point cloud. As yet another option, the source model can be deformed to more closely match the shape of the target model prior to generating the point cloud.

One aspect of the present invention relates to a method for transferring texture information from a source object to a target object is provided. In some embodiments, a source geometric model of a source object is provided. The source geometric model defines a source surface in a three dimensional ("3 D") space and a mapping from positions on the source surface to coordinates in a source texture space. A source texture map is also provided; the source texture map associates attribute values with texels located at particular coordinates in the source texture space. A target geometric model of a target object is also provided. The target geometric model defines a target surface in the 3 D space and a mapping from positions on the target surface to coordinates in a target texture space. A number of sampling locations on the source surface are selected. A point cloud comprising a plurality of points is created. Each point has 3-D space coordinates corresponding to a respective one of the source sampling locations, and creating the point cloud advantageously includes determining an attribute value for each point by sampling the source texture map at the respective one of the source sampling locations. A target location on the target surface is identified; the target location advantageously maps to one of a number of target texels located at particular coordinates in the target texture space. A target attribute value for the target location is determined using the point cloud. The target attribute value is stored in association with the mapped-to target texel in a target texture map. Thus, the target texture map can become populated with information extracted from the source texture map via the point cloud.

The above-described method includes two phases, either of which can be practiced separately to transfer texture information to or from a point cloud. Thus, another aspect of the invention relates to a method for generating a point cloud from a texture. In some embodiments, a source geometric model of a source object is provided. The source geometric model defines a source surface in a three dimensional ("3 D") space and a mapping from positions on the source surface to coordinates in a source texture space. A source texture map is also provided; the source texture map associates attribute values with texels located at particular coordinates in the source texture space. A number of sampling locations on the source surface are selected. A point cloud comprising a plurality of points is created. Each point has 3-D space coordinates corresponding to a respective one of the source sampling locations, and creating the point cloud advantageously includes determining an attribute value for each point by sampling the source texture map at the respective one of the source sampling locations. The point cloud thus created can be stored and used in any manner (including but not limited to transferring the texture information to another object).

Similarly, yet another aspect of the invention relates to a method for generating a texture from a point cloud. In some embodiments, a target geometric model of a target object is provided. The target geometric model defines a target surface in the 3 D space and a mapping from positions on the target surface to coordinates in a target texture space. A point cloud comprising a number of points is also provided. Each point in the point cloud has 3-D space coordinates and an associated attribute value. A target location on the target surface is identified; the target location advantageously maps to one of a number of target texels located at particular coordinates in the target texture space. A target attribute value for the target location is determined using the point cloud. The target attribute value is stored in association with the mapped-to target texel in a target texture map.

The following detailed description together with the accompanying drawings will provide a better understanding of the nature and advantages of the present invention.

BRIEF DESCRIPTION OF THE DRAWINGS

FIG. 1A (front view) and FIG. 1B (top view) illustrate an original object, a modified object, and a point cloud. FIG. 1C illustrates texture maps associated with the original and modified objects.

DETAILED DESCRIPTION OF THE INVENTION

Embodiments of the present invention provide systems and methods for transferring textures between different object models using a point cloud. In a first phase, a point cloud in 3-D space is created to represent a texture map as applied to a first, or "source," object model. In some embodiments, the point cloud has the property that each texel of the texture map is represented by a point in the point cloud; for each texel, a corresponding location on a surface in 3-D space defined by the source object model is identified, and the point cloud point has the coordinates of the corresponding location and the attribute value of the texel. An attribute value for a target texel of a texture map associated with a second, or "target," object model, is determined by identifying the 3-D location on a surface defined by the target object model that maps to the texture-space coordinates of the target texel and assigning an attribute value to the target texel based on the attribute value of the nearest point (or points) to that location in the 3-D point cloud. In this manner, a texture map for the target object model can be automatically populated with texel values. To the extent that differences between the source and target object models are minor (e.g., adding detail or making small modifications to the shape), the texture transfer can be accomplished without loss of information or manual cleanup.

Where differences between the source and target object models are larger, it is possible to perform intermediate modifications so that the point cloud will better register with the target model. For example, if an object is being stretched (or compressed) in a particular direction in the target model, the point cloud can also be stretched (or compressed) in that direction before the texels associated with the target model are matched to points in the point cloud. Alternatively, the target model can be temporarily deformed to more closely match the shape of the point cloud. As yet another option, the source model can be deformed to more closely match the shape of the target model prior to generating the point cloud.

Figure 1A:
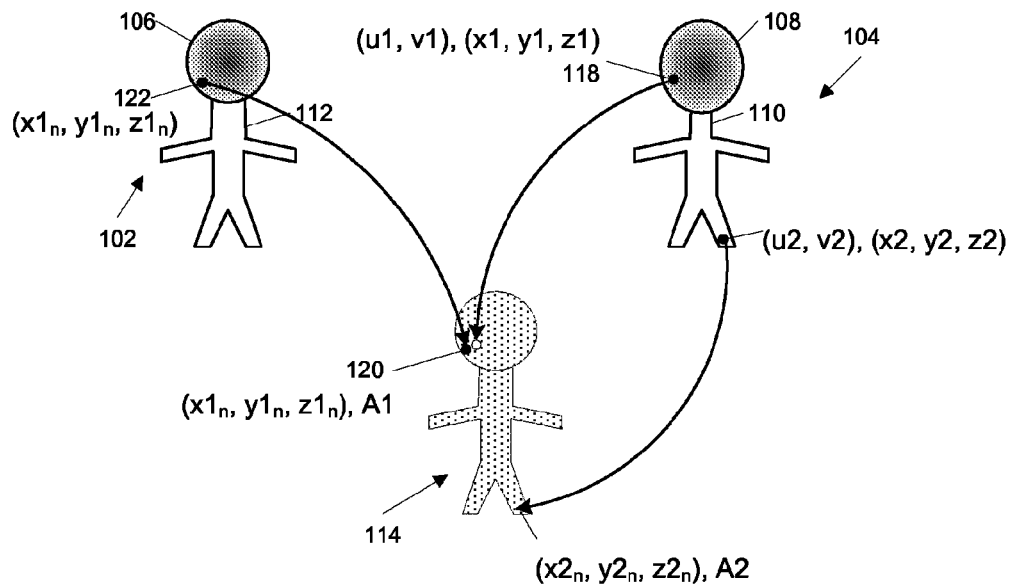
FIGS. 1A-1C illustrate an operating principle of an embodiment of the present invention.
Figure 1B:
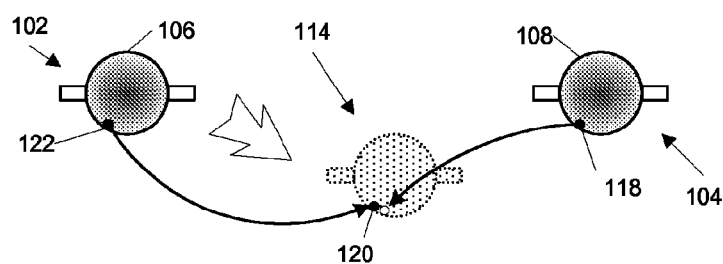
Figure 1C:
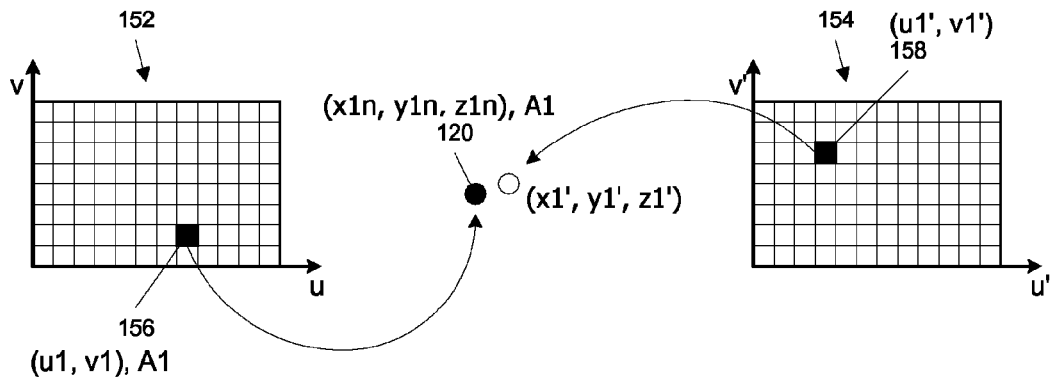

FIGS. 1A-1C illustrate an operating principle of an embodiment of the present invention. Shown in FIGS. 1A (front view) and 1B (top view) are respective geometries of an original 3-D object 102 and a modified object 104 that in this example is created by modifying object 102. For example, object 102 has a round head 106, which has been extended in the vertical plane to an ellipsoidal shape (head 108) in object 104, and the neck 110 of object 104 is somewhat thinner than the neck 112 of object 102. Such modifications might be made, e.g., by a modeling artist, in the course of developing a desired look for a character in an animated movie. Object 102 has an attribute (e.g., color, surface normal, etc.) that is defined using a texture map (not shown).

The texture maps are depicted in FIG. 1C. Original texture map 152 is associated with a model of original object 102. Original texture map 152 in this embodiment is a two-dimensional ("2-D") texture map that associates attribute values with (u, v) texture space coordinates. Although not explicitly shown in FIGS. 1A-1C, a mapping exists between locations on the surface of object 102 and the (u, v) texture space coordinates of texture map 152. Likewise, modified texture map 154 is associated with a model of modified object 104. Modified texture map 154 in this embodiment is another 2-D texture map that associates attribute values with (u', v') texture space coordinates. Although not explicitly shown in FIGS. 1A-1C, a mapping exists between locations on the surface of object 104 and the (u', v') texture space coordinates of texture map 154.

In accordance with an embodiment of the present invention, the texture map associated with object 102 can be transferred to a texture map associated with object 104 using a 3-D point cloud. A "point cloud," as used herein, is a data structure that identifies a number of discrete points in a 3-D coordinate space and associates values of one or more attributes with each of these points. In this example, a point cloud 114 (best seen in FIGS. 1A and 1B) is defined using original object 102 and original texture map 152. In one embodiment, each point in point cloud 114 (e.g., points 120, 122) corresponds to a texel in original texture map 152 and is located at the position in (x, y, z) object modeling space that maps to the texture-space (u, v) location of the corresponding texel. The attribute value (A) of the corresponding texel becomes an attribute of the transfer point. Thus, for example, FIGS. 1A-1C illustrate that point 122 on object 106, which has 3-D coordinates $(x1_n, y1_n, z1_n)$ corresponds to texel 156 of texture map 152, which has texture-space coordinates (u1, v1) and attribute value A1. A corresponding point 120 in point cloud 114 has 3-D coordinates $(x1_n, y1_n, z1_n)$ and attribute value A1.

To transfer the texture map from object 102 to object 104 in one embodiment, a location in the 3-D object modeling space of object 104 that corresponds to a texel of modified texture map 154 (which is associated with object 104) is determined. That 3-D location is matched to its nearest neighbor in point cloud 114, and the attribute value associated with the nearest neighbor becomes the texel value for that texel of the texture map associated with object 104. Thus, for example, as seen in FIGS. 1A-1C, the texel at texture coordinates (u1', v1') in texture map 154 (associated with object 104) maps to surface location 118 on object 104, which has modeling space coordinates (x1, y1, z1). The nearest neighbor of point 118 in point cloud 114 is point 120, which has coordinates $(x1_n, y1_n, z1_n)$ and an attribute value A1. Accordingly, texel (u1', v1') in texture map 154 can be assigned attribute value A1. Each texel of a texture map for object 104 can be populated with an attribute value in this manner. In general, multiple texels in the modified object model can match to the same point-cloud point, and it is not required that all point-cloud points match to a texel in the modified texture map.

Figure 2:
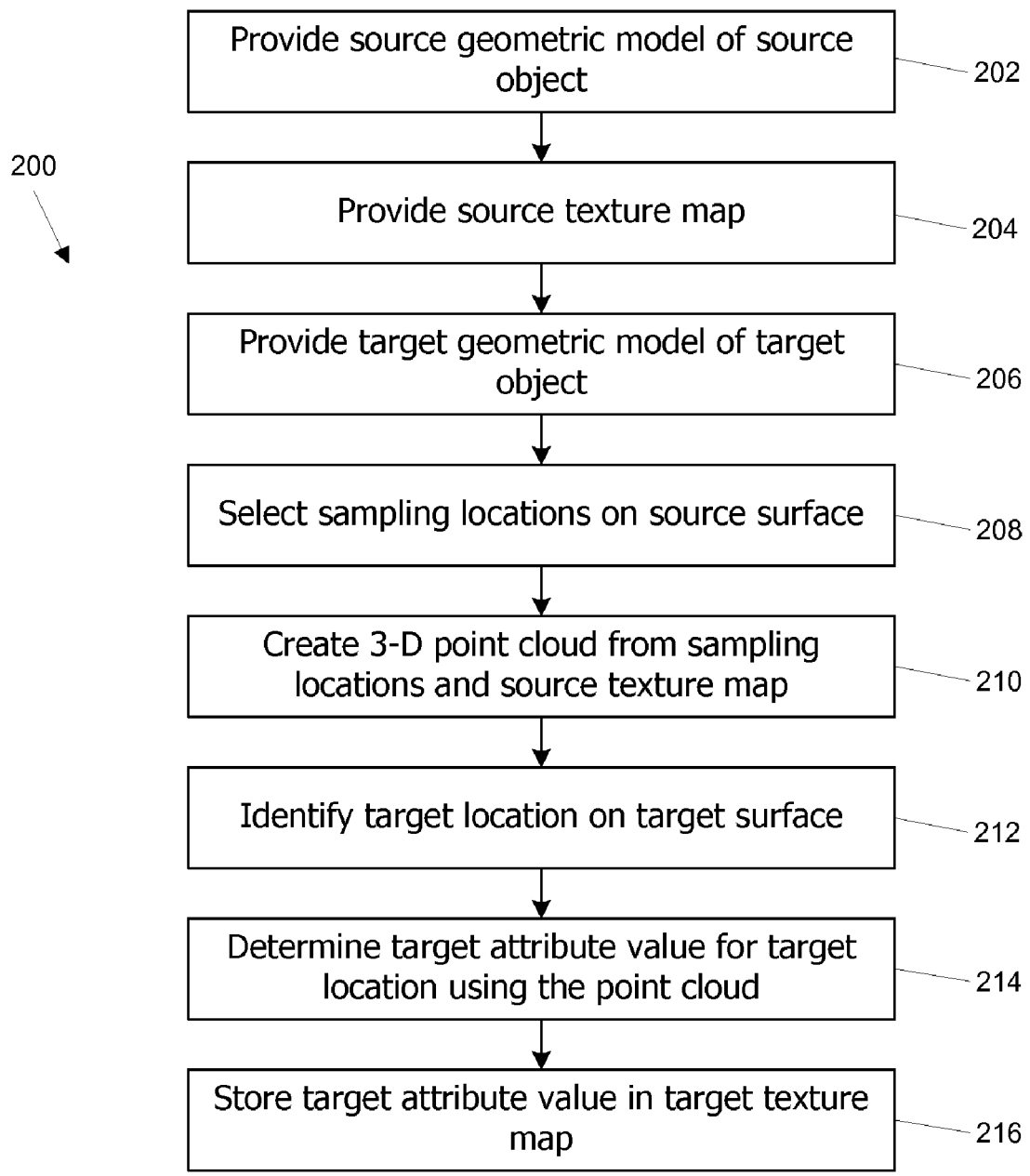
FIG. 2 is a flow diagram of a process for transferring a texture to a modified object model according to an embodiment of the present invention.

FIG. 2 is a flow diagram of a process 200 for transferring a texture to a target object model according to an embodiment of the present invention. Process 200 starts at step 202 where a source geometric model is provided. The source geometric model defines a source surface in 3-D space. For instance, the source geometric model can include a control mesh (e.g., a set of control vertices and associated rules for interpolating between the control vertices to define a surface). The model also provides a mapping from locations on the source surface to coordinates in a source texture space. Referring to FIGS. 1A-1C, object 102 represents an example of a source geometric model, and texture map 152 represents a texture map in a (u, v) texture space; the texture mapping in this instance (not explicitly shown) would be the association between locations on the surface of object 102 and (u, v) coordinates in texture map 152. It should be noted that for complex objects it may be useful to provide multiple texture maps with each texture map being mapped to a portion of the object's surface. Thus, for example, head 106 of object 102 might be mapped to texture map 152 of FIG. 1C while neck 112 of object 102 might be mapped to a different texture map (not shown). Such use of multiple texture maps is known in the art, and the present invention should be understood as encompassing instances where one or more texture maps are used to "cover" a modeled surface.

Referring again to FIG. 2, at step 204, a source texture map, associated with the source geometric model, is provided. The source texture map associates attribute values with texture-space coordinates. Map 152 in FIG. 1C is an example of a source texture map. As noted above, multiple source texture maps can be provided, with different source texture maps being mapped to different portions of the object's surface.

At step 206 (FIG. 2), a target geometric model is provided. The target geometric model defines a target surface in the 3-D space; as with the source geometric model, control meshes or other surface-defining structures and/or objects can be used. Also like the source geometric model, the target geometric model provides a mapping from locations on the target surface to coordinates in a target texture space. Referring to FIGS. 1A-1C, object 104 represents an example of a target geometric model, and texture map 154 represents a texture map in a (u', v') texture space; the texture mapping in this instance (not explicitly shown) would be the association between locations on the surface of object 104 and (u', v') coordinates in texture map 154. As with the source texture map, multiple target texture maps can be provided, with each texture map being mapped to a portion of the target object's surface. The target texture map (e.g., map 154 of FIG. 1C) is to be created and populated with attribute values by process 200. In some embodiments, a target texture map is provided with texels that are initialized in any desired manner (or indeed uninitialized).

The source and target geometric models (including texture mappings), as well as the source texture map, can be provided in various ways. For example, a modeling artist using modeling software can create the source model and source texture map using conventional techniques. The source model and texture map can be created using the same software that performs process 200, or it can be created by different software, stored as a data file, and read by the software that performs process 200. The model may be represented in any manner desired, e.g., polygon meshes, subdivision surfaces, or the like.

In some embodiments, the target geometric model is provided by modifying the source geometric model. Such modification can include reshaping of some portion of the object being modeled, adding more detail to the model, removing detail from the model, and so on. For example, new control vertices can be added to increase detail, existing control vertices can be deleted or modified, and so on. The target texture mapping (the correspondence between locations on a surface defined by the target geometric model and coordinates in the target texture space, e.g., (u', v')) can be determined from the target geometric model using known techniques. This mapping might or might not resemble the source texture mapping.

At step 208, a number of sampling locations on a surface defined by the source geometric model (also referred to herein as a "source surface") are selected. In one embodiment, the sampling locations are selected to correspond to the center of each texel in the source texture map. That is, each texel has coordinates (u, v) that correspond to a location on the source surface, and for each texel, the texture mapping is used to identify that location in 3-D object space. (While texture mapping is usually thought of as a mapping from 3-D object space to texture coordinate space, those skilled in the art with access to the present teachings will recognize that it can also be viewed as a mapping from texture coordinate space to 3-D object space.)

At step 210, a point cloud is created. As used herein, a "point cloud" can encompass any data structure that associates locations in a 3-D space with attribute values. In one embodiment, the point cloud includes a point corresponding to each of the sampling locations selected at step 210; the attribute value for each point is determined by sampling the source texture map at the sampling location. In one embodiment where the sampling locations correspond to the texels, the texel value becomes the attribute value for the point in the point cloud. Thus, the texture information is transferred from the source object model to the point cloud.

Various techniques can be used to implement steps 208 and 210, depending in part on the modeling techniques used to describe the object geometry. For example, in some embodiments, object geometry is modeled using surface subdivision, as is known in the art. In this case, it can be efficient to generate the point cloud by traversing the texture coordinate space and determining the 3-D location of a point corresponding to each texel by subdividing the surface to the extent needed for accurate mapping.

Alternatively, the point cloud can be created by traversing the object surface in a well-defined pattern, such as from one control vertex to the next, and using the texture mapping to associate an attribute value with each of a number of selected sampling locations (which might include some or all of the control vertices and/or other surface locations between control vertices). The attribute value can be the value associated with a single texel, or values from multiple texels can be blended, or filtered. Thus, the point cloud may include any number of points. A one-to-one correspondence between point-cloud points and texels in the source texture map is not required. For example, if the density of points in the point cloud becomes high in some region (where "high" density can be evaluated, e.g., relative to the number of texels in the target map that map to that region), a decision might be made to reduce the number of point-cloud points in that region, e.g., by filtering multiple texel values to determine the attribute value for each point-cloud point in that region. As another example, if the target texture map is to be at a lower resolution than the source texture map, a decision might be made to filter the texture information as the point cloud is generated. The texture information can also be oversampled in generating the point cloud if desired, although in general such oversampling would not add information.

For complex objects, the point cloud generally includes a large number of points. Since the point cloud will be used to map from 3-D coordinates (x, y, z) to attribute values, it can be helpful to represent the point cloud using a data structure that facilitates efficient lookup using (x, y, z) coordinates. For example, a k-D tree (with k=3) can be used. A k-D tree is a well-known data structure based on the binary tree. In a k-D tree, each node is a binary decision point, and decisions at successive nodes are based on orthogonal coordinates. Thus, for example, in a 3-D tree, the first node might correspond to a decision based on the x coordinate, the next node to y, the third node to z, the fourth node to x again, and so on until a leaf node is reached. Each leaf node stores an attribute value that will be associated with any reference point of the modified object model that corresponds to that leaf node. It is to be understood that other data structures can also be used to represent the point cloud.

At step 212, a target location in 3-D object space corresponding to a texel of the target texture map is determined. The target location for a particular texel can be, for example, a location on the target surface (i.e., a surface defined by the target object model) that maps to the texel in the target texture map. Similarly to step 208, the determination of target locations at step 212 can involve a reversal of the usual sense of texture mapping; one starts from the texture-space coordinates of the target texel and determines the corresponding coordinates in 3-D object space.

At step 214, an attribute value for the texel is determined using the target location determined at step 212 and the point cloud. In one embodiment, for a target location at coordinates (x, y, z), the nearest neighbor point-cloud point $(x_n, y_n, z_n)$ is identified, and the attribute value associated with the nearest neighbor point-cloud point $(x_n, y_n, z_n)$ becomes the attribute value for the target texel. "Nearest neighbor" can be defined, e.g., using the Euclidean distance metric $((x-x_n)+(y-y_n)^2+(z-z_n)^2)^{1/2}$ or another distance metric. Again, it is not required that every point-cloud point be a nearest neighbor of some target location point or that the nearest neighbor for different target locations be a different point-cloud point.

In another embodiment, attribute values associated with multiple neighboring point-cloud points can be blended, or filtered, to generate an attribute value for a target texel. For example, attribute values for all neighboring point-cloud points in the point cloud within a maximum distance r from the target location (x, y, z) can be filtered. The attribute values for each neighboring point-cloud point can be weighted, e.g., by $1/r$, $1/r^2$ or other factor that decreases with distance, or all neighboring point-cloud points within the specified radius could be weighted equally.

In some embodiments, the nearest neighbor point-cloud point is used to determine the attribute value for the target texel regardless of the distance between the target location and the nearest neighbor point-cloud point. In other embodiments, a distance cutoff is applied; if no neighboring point-cloud point is found within a maximum acceptable distance, the texel is set to a value indicating that no information was available from the point cloud. This value might be, e.g., a default value such as a value associated with "blank" texels (e.g., a background color if the attribute being transferred is color).

At step 216, the attribute value determined at step 214 is stored as a texel in the target texture map. Steps 212, 214 and 216 can be performed (iteratively or in parallel) for every texel in the target texture map, thus fully populating the map. If desired, manual cleanup of the target texture map can be performed, e.g., using texture-editing tools available in conventional paint programs. Manual cleanup might be desired, e.g., if the source and target surfaces differ significantly over some portion thereof. Such cleanup can include adding texture information to the target texture map and/or modifying the texture information in the target texture map; cleanup can be guided by a user's esthetic judgment or other information not available within the program.

The target object model and associated target texture map can be stored, e.g., in a computer memory or in a non-volatile storage medium such as a hard disk. The target object model can then be used to render images (e.g., animated images) that can also be stored and/or displayed. For instance, image data can be stored in a computer-readable storage medium and used to drive a digital or analog display device, such as a computer monitor or projection system; image data can also be used to generate images on film or other similar medium, allowing the images to be projected, e.g., as a movie.

It will be appreciated that texture transfer process 200 is illustrative and that variations and modifications are possible. Steps described as sequential may be executed in parallel, order of steps may be varied, and steps may be modified or combined. For example, the terms "source" and "target" are used herein merely to distinguish one model from another. In some embodiments, the source and target models may be different versions of models of the same object (e.g., successive versions of a model of a character for an animated movie). Thus, process 200 can be used repeatedly to transfer textures from one version of a model to the next as character or other object models are developed over the course of a project. In other embodiments, they can be models of different objects.

Process 200 generally achieves its best results when there is good registration (i.e., closeness of match) between the point-cloud points and the target locations identified at step 214, which is usually the case when the source and target models have similar overall shapes. Where this is not the case, process 200 can still be used, but the amount of useful information transferred may diminish. Thus, when using process 200 to transfer textures between successive versions of an object model, it may be desirable to modify the model in a series of small incremental stages; at each stage, process 200 can be used to transfer the texture, and the texture map can be manually adjusted if desired after each transfer. In some embodiments, the breakdown of large changes into smaller stages can be automated, with a computer automatically creating an incrementally changed model and prompting the user to adjust the texture before proceeding to the next incremental change.

Figure 3:
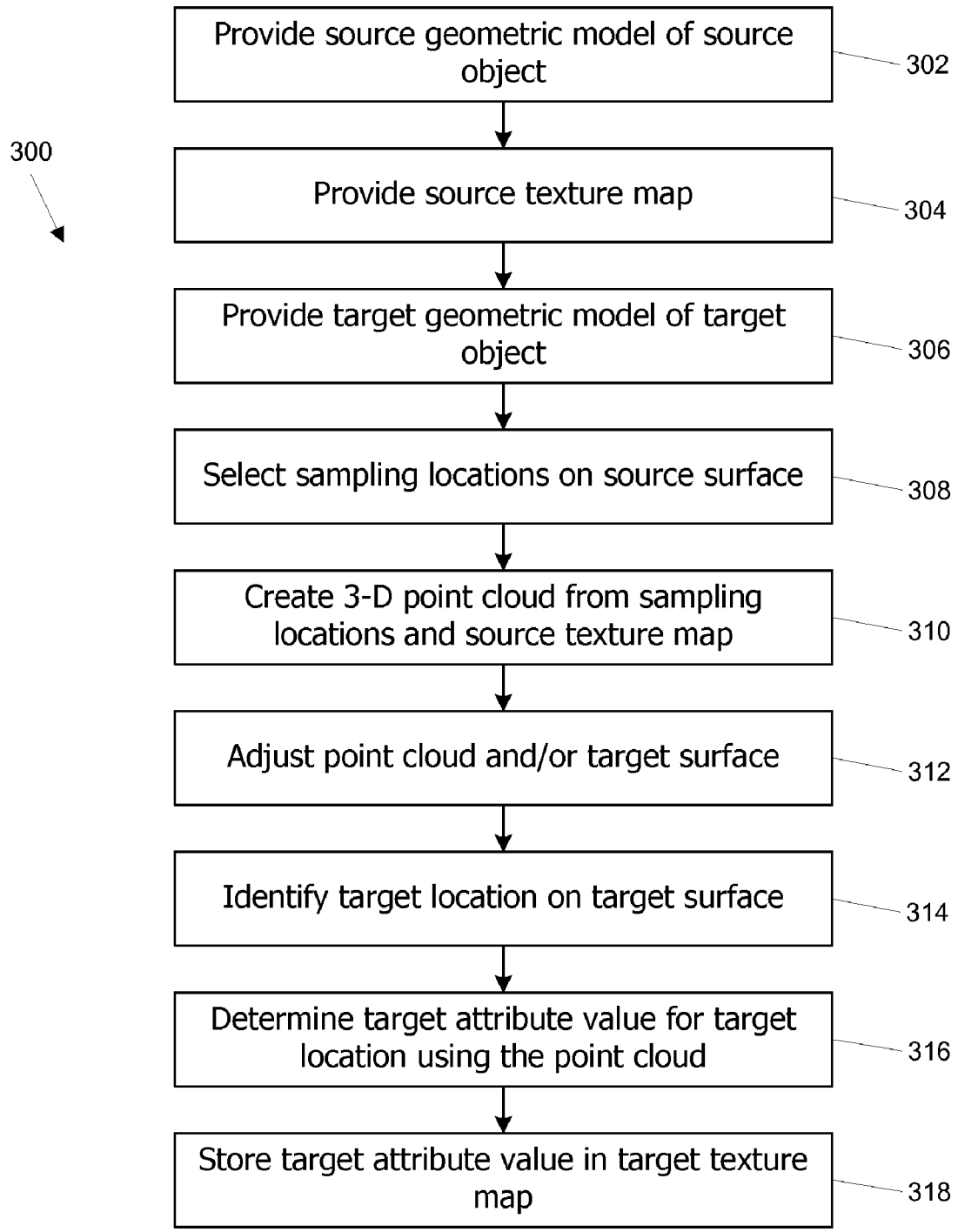
FIG. 3 is a flow diagram of a process for transferring a texture to a modified object model according to another embodiment of the present invention.

FIG. 3 is a flow diagram of a process 300 for transferring a texture according to another embodiment of the present invention. Process 300 is generally similar to process 200 but includes additional operations to improve registration between the target locations and the point cloud.

At step 302, a source object model is provided, and at step 304, a source texture map is provided. At step 306, a target object model is provided. These steps may be similar or identical to corresponding steps in process 200 of FIG. 2.

At step 308, sampling locations on the source surface are selected, and at step 310, a point cloud is created from the source geometric model and the source texture map. Any or all of the techniques described above with reference to steps 208 and 210 of process 200 can be used in creating the point cloud.

At step 310, the point cloud can be adjusted to improve its registration with the target surface. For example, if the source and target geometric models are original and modified models of a character whose head has been elongated, the portion of the point cloud corresponding to the head can be elongated by a similar factor. As another example, if the source geometric model represents a relatively large object (e.g., a trash can) while the target geometric model represents a smaller object of similar shape (e.g., a coffee mug), the overall size of the point cloud generated from the model of the larger object can be scaled down to better match the size of the smaller object.

Adjustment of the point cloud at step 310 can change the 3-D location of one or more point-cloud points without altering the attribute values associated with any of the points. Alternatively, as described below, the target surface can be adjusted to improve its registration with the point cloud; where this is the case, it is the adjusted target surface that is used in subsequent steps of process 300.

Once the point cloud is generated and modified, at step 314 a target location on the target surface is identified. At step 316, a target attribute value for the target location is determined using the point cloud (as modified at step 310). At step 318, the target attribute value is stored as the target texel of the target texture map. Any or all of the techniques described above with reference to corresponding steps of process 200 can be used.

As in process 200, the target object model and the target texture map can be stored, e.g., in a computer memory or in a non-volatile storage medium such as a hard disk. The target object model can then be used to render images (e.g., animated images) that can also be stored and/or displayed as noted above.

Figure 4A:
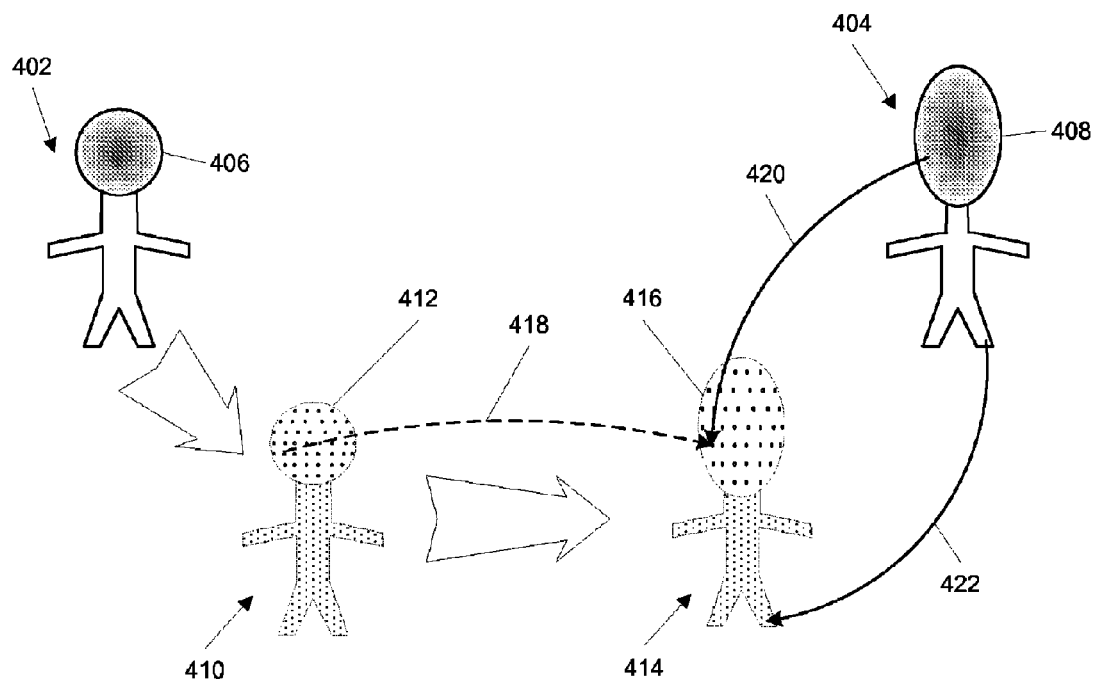
FIGS. 4A (front view) and 4B (top view) illustrate steps in the process of FIG. 3.
Figure 4B:
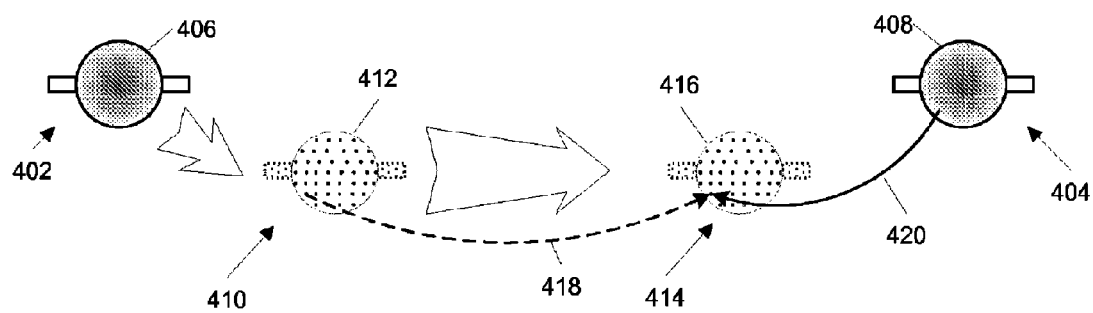

FIG. 4 illustrates steps in process 300. Shown in FIGS. 4A (front view) and 4B (top view) are respective geometries of an original 3-D object 402 and a modified object 404 that is created by modifying object 402. For example, original object 402 has a round head 406, which has been extended to an ellipsoidal shape (head 408) in modified object 404. A first point cloud 410 is generated from original object 402 (corresponding to step 310 of process 300). Point cloud 410 is then modified by elongating the head portion 412, producing a modified point cloud 414 with an elongated head portion 416 (corresponding to step 312 of process 300). Dashed arrow 418 indicates a correspondence between one point in head portion 412 of point cloud 410 and one point in head portion 416 of modified point cloud 414. Thereafter, target locations on modified object 404 (corresponding to texels in the target texture map) are identified and attribute values associated with the target locations are determined from modified point cloud 414. Arrows 420, 422 indicate mappings from particular target locations on modified object 402 to points in modified point cloud 414.

It will be appreciated that process 300 is also illustrative and that variations and modifications are possible. Steps described as sequential may be executed in parallel, order of steps may be varied, and steps may be modified or combined. Improving the registration between the target geometric model and the point cloud can be done using a variety of techniques, not limited to those described above. For example, matching a target location on the surface defined by the target geometric model to a point in the point cloud can be done using the original point cloud and a variant of the target geometric model in which the surface shape has been distorted to better match the shape of the point cloud. In another alternative embodiment, the source geometric model can be altered to better match the overall shape of the target geometric model before the point cloud is constructed. Large modifications can also be accomplished in stages as described above, with optional adjustments to improve registration occurring at any or all of the stages.

While the invention has been described with respect to specific embodiments, one skilled in the art will recognize that numerous modifications are possible. As noted above, the texture transfer processes described herein can be used repeatedly as the "look" of a character or other object is being refined. To the extent that portions of the geometric model are not modified, the original texture will be preserved in the transfer. The greater the modification at a given stage, the greater the likelihood that unwanted distortion or loss of information will result; manual touch-up may be useful for portions of an object to which a substantial modification is made.

Further, embodiments of the invention are not limited to transferring textures between different versions of models of the same object. Textures can be transferred between any two object models, although as noted above, best results generally are achieved if the two objects have similar shapes so that there is good registration between the point cloud and the target locations.

In some embodiments, as noted above, the point-cloud point(s) to be used in generating an attribute value for a texel of the target texture map are selected based on a distance metric. The distance metric can be, e.g., the Euclidean distance between the target location and a point cloud point. In other embodiments, different distance metrics can be defined, and these metrics can incorporate criteria other than spatial distance that may aid in identification of which portions of the point cloud and target surface best relate to each other. For example, in one alternative embodiment, the point-cloud points and points on the surface defined by the target object model each have a surface normal associated therewith. The surface normal of the point-cloud point is advantageously determined from the surface normals of the original geometric model. Prior to selecting a neighboring point-cloud point for a given target location, the surface normals can be compared (e.g., by computing the dot product of the surface normal vectors of the point-cloud point and the target location), and point-cloud points whose surface normals are a poor match (e.g., where the dot product is below some threshold) can be excluded from the selection. In yet another embodiment, an "effective distance" for selecting neighboring point-cloud points can be defined based on a combination of spatial distance and surface-normal match (e.g., dot product), with good surface normal match reducing the effective distance. One or more neighboring point-cloud points for a given target location can be selected based on the effective distance. Use of surface normals can be particularly helpful in instances where a surface has relatively sharp curvature (e.g., at corners). Still other criteria could also be used to define effective distance, such as curvature, gradient vector, medial axis, or the like.

As noted, textures are often used to represent colors or color variations, but the present invention is not limited to any particular use of textures. Bump maps, surface normal maps, and other textures that do not directly identify a color can also be transferred in the manner described herein. Further, although embodiments described herein may make reference to two-dimensional texture spaces, the invention is not limited to two-dimensional textures; for instance, three-dimensional textures can also be used. Where an object model has multiple associated textures, the processes described herein can be used to transfer any or all of those textures.

It should also be noted that the texture-transfer processes described herein include two phases. In the first phase, a 3-D point cloud is generated from a geometric model and a 2-D texture (e.g., using steps 202, 204, 208 and 210 of process 200). In the second phase, the 3-D point cloud is used to establish a 2-D texture and texture mapping for another geometric model (e.g., using steps 206, 212, 214, and 216 of process 200). Either of these phases could be practiced without the other. For example, the RenderMan™ software package (sold by Pixar Studios) provides tools that enable a user to define a 3-D point cloud and associate attribute values with the points in the point cloud. Such a point cloud could then be applied to a geometric model of an object using the second phase of the texture transfer process of FIG. 2 (or a similar process) to produce a texture. In another example, a point cloud can be used to capture ambient occlusion information; the second phase of the texture transfer process of FIG. 2 (or a similar process) can then be used to convert the occlusion information in the point cloud to a texture, which a user can modify using a paint program. Conversely, the first phase of the texture transfer process can be used to generate a 3-D point cloud from 2-D texture data, and point clouds generated in this manner can be used for a variety of purposes.

Some components of the processes described herein can be implemented using suitably-configured computer systems. Such systems may be of conventional design and may include standard components such as microprocessors, monitors, keyboards, mice and/or other pointing devices, magnetic disk drives, CD or DVD drives, flash drives, network interface components that support communication between or among multiple computer systems, and the like. In addition, interconnected groups of computers (e.g., server farms) may be used to practice aspects of the present invention.

In some embodiments, the processes described above are implemented as one or more software programs that can be executed on conventional computer systems; conventional programming and/or scripting languages and techniques can be used. These may be standalone programs or programs integrated into other applications such as a modeling and/or paint application. In one embodiment, a conventional paint program is augmented by adding a first user interface component that allows a user to instruct the program to extract texture information from a selected object model to a point cloud, which can be saved to a file, and a second user interface component that allows the user to create a texture map for a selected object model using a point cloud that can be read from a file. These user interface components can, for example, invoke programs that implement the appropriate steps of process 200. In addition, a separate program may be provided to allow the user to view and adjust the point cloud; for instance, an image of the point cloud can be rendered on screen, and the user can operate various tools to rotate the view, zoom in or out, select points to modify, and so on. Other embodiments might allow the user to view and interact with the point cloud within the paint program, and saving the point cloud to a file would not be required.

While the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable storage media; suitable media include magnetic disk or tape, optical storage media such as CD or DVD, flash memory, and the like. Such programs may also be encoded and transmitted using carrier signals adapted for transmission via wired, optical, and/or wireless networks conforming to a variety of protocols, including the Internet. Computer readable media encoded with the program code may be packaged with a compatible device or provided separately from other devices (e.g., via Internet download to a storage medium connected to the recipient's computer system).

Thus, although the invention has been described with respect to specific embodiments, it will be appreciated that the invention is intended to cover all modifications and equivalents within the scope of the following claims.

What is claimed is:

1. A method for transferring texture information from a source object to a target object, the method comprising:
providing, at a computer system, a source geometric model of a source object, the source geometric model defining a source surface in a three-dimensional ("3-D") space and a mapping from positions on the source surface to coordinates in a source texture space;
providing, at the computer system, a source texture map, wherein the source texture map associates attribute values with texels located at particular coordinates in the source texture space;
providing, at the computer system, a target geometric model of a target object, the target geometric model defining a target surface in the 3-D space and a mapping from positions on the target surface to coordinates in a target texture space;
selecting, by the computer system, a plurality of sampling locations on the source surface;
creating, by the computer system, a point cloud comprising a plurality of points, each point having 3-D space coordinates corresponding to a respective one of the source sampling locations, wherein creating the point cloud includes determining an attribute value for each point by sampling the source texture map at the respective one of the source sampling locations;
identifying, by the computer system, \ a target location on the target surface, wherein the target location maps to one of a plurality of target texels located at particular coordinates in the target texture space;
determining, by the computer system, a target attribute value for the target location using the point cloud; and
storing, by the computer system, the target attribute value in association with the mapped-to target texel in a target texture map.

2. The method of claim 1 wherein the act of determining includes:
identifying, as a nearest neighbor point, the one of the points in the point cloud that is closest to the target location according to a distance metric; and
assigning, as the target attribute value, the attribute value that is associated with the nearest neighbor point.

3. The method of claim 2 wherein the distance metric is a Euclidean distance in the 3-D space.

4. The method of claim 2 wherein the target location and each of the points in the point cloud has a surface normal associated therewith and wherein the distance metric is based at least in part on a degree of similarity of the respective surface normals of the target location and the point in the point cloud.

5. The method of claim 1 wherein the act of determining includes:
identifying, as a nearest neighbor point, the one of the points in the point cloud that is closest to the target location according to a distance metric;
detecting whether the nearest neighbor point is within a threshold distance of the target location according to the distance metric;
in the event that the nearest neighbor point is within the threshold distance, assigning, as the target attribute value, the attribute value that is associated with the nearest neighbor point; and
in the event that the nearest neighbor point is not within the threshold distance, assigning, as the target attribute value, a default value.

6. The method of claim 1 wherein the act of determining includes:
identifying, as neighbor points, at least two of the points in the point cloud that are closest to the target location according to a distance metric; and
computing the target attribute value by blending the respective attribute values of the neighbor points.

7. The method of claim 6 wherein the distance metric is a Euclidean distance in the 3-D space.

8. The method of claim 6 wherein the target location and each of the points in the point cloud has a surface normal associated therewith and wherein the distance metric is based at least in part on a degree of similarity of the respective surface normals of the target location and the point in the point cloud.

9. The method of claim 1 further comprising:
prior to the act of determining, adjusting the point cloud to improve a degree of correspondence between a shape of the point cloud and a shape of the target surface.

10. The method of claim 1 further comprising:
prior to the act of creating the point cloud, modifying the source surface to improve a degree of correspondence between a shape of the source surface and a shape of the target surface.

11. The method of claim 1 wherein the act of determining includes temporarily adjusting the target surface to improve a degree of correspondence between a shape of the target surface and a shape of the point cloud.

12. The method of claim 1 wherein the act of providing the target geometric model includes providing, as the target geometric model, a modified version of the source geometric model.

13. The method of claim 12 wherein the source geometric model and the target geometric model each include a plurality of control vertices and wherein the target geometric model is obtainable from the source model by at least one of the following modifications:
adding a new control vertex to the source geometric model;
deleting one of the control vertices from the source geometric model; or
moving one of the control vertices of the source geometric model.

14. The method of claim 1 wherein the act of selecting the plurality of sampling locations includes selecting one sampling location corresponding to each texel of the source texture map.

15. The method of claim 14 wherein during the act of creating the point cloud, each sampling point is assigned the attribute value of the corresponding texel of the source texture map.

16. The method of claim 1 wherein the act of creating the point cloud includes:
identifying one or more texels of the source texture map that correspond to a first one of the sampling points;
computing an attribute value using the one or more of the texels of the source texture map; and
associating the computed attribute value with the coordinates of the first one of the sampling points.

17. The method of claim 1 wherein the act of creating the point cloud includes:
storing each of the points in the point cloud in a data structure that facilitates efficient lookup using 3-D coordinates.

18. The method of claim 17 wherein the data structure is a k-D tree.

19. The method of claim 1 further comprising:
rendering an image using the target geometric model and the target texture map.

20. The method of claim 19 further comprising:
storing the image on a storage medium.

21. The method of claim 20 wherein the storage medium comprises film.

22. The method of claim 20 wherein the storage medium comprises a computer-readable storage medium that stores a digital representation of the image.

23. A method for generating a point cloud from a texture, the method comprising:
providing, at a computer system, a source geometric model of a source object, the source geometric model defining a source surface in a three-dimensional ("3-D") space and a mapping from positions on the source surface to coordinates in a source texture space;
providing, at the computer system, a source texture map, wherein the source texture map associates attribute values with texels located at particular coordinates in the source texture space;
selecting, by the computer system, a plurality of sampling locations on the source surface;
creating, by the computer system, a point cloud comprising a plurality of points, each point having 3-D space coordinates corresponding to a respective one of the source sampling locations, wherein creating the point cloud includes determining an attribute value for each point by sampling the source texture map at the respective one of the source sampling locations; and
storing, by the computer system, the point cloud.

24. The method of claim 23 wherein the act of selecting the plurality of sampling locations includes selecting one sampling location corresponding to each texel of the source texture map.

25. The method of claim 24 wherein during the act of creating the point cloud, each sampling point is assigned the attribute value of the corresponding texel of the source texture map.

26. The method of claim 23 wherein the act of creating the point cloud includes:
identifying one or more texels of the source texture map that correspond to a first one of the sampling points;
computing an attribute value using the one or more of the texels of the source texture map; and
associating the computed attribute value with the coordinates of the first one of the sampling points.

27. The method of claim 23 wherein the act of storing the point cloud includes:
storing each of the points in the point cloud in a data structure that facilitates efficient lookup using 3-D coordinates.

28. A method for generating a texture from a point cloud, the method comprising:
providing, at a computer system, a target geometric model of a target object, the target geometric model defining a target surface in a three-dimensional ("3-D") space and a mapping from positions on the target surface to coordinates in a target texture space;
providing, at the computer system, a point cloud comprising a plurality of points, each point having 3-D space coordinates and an associated attribute value;
identifying, by the computer system, a target location on the target surface, wherein the target location maps to one of a plurality of texels located at particular coordinates in the target texture space;
determining, by the computer system, a target attribute value for the target location using the point cloud; and
storing, by the computer system, the target attribute value in association with the mapped-to target texel in a target texture map.

29. The method of claim 28 wherein the act of determining includes:
identifying, as a nearest neighbor point, the one of the points in the point cloud that is closest to the target location according to a distance metric; and
assigning, as the target attribute value, the attribute value that is associated with the nearest neighbor point.

30. The method of claim 29 wherein the distance metric is a Euclidean distance in the 3-D space.

31. The method of claim 29 wherein the target location and each of the points in the point cloud has a surface normal associated therewith and wherein the distance metric is based at least in part on a degree of similarity of the respective surface normals of the target location and the point in the point cloud.

32. The method of claim 28 wherein the act of determining includes:
identifying, as neighbor points, at least two of the points in the point cloud that are closest to the target location according to a distance metric; and
computing the target attribute value by blending the respective attribute values of the neighbor points.

33. The method of claim 28 wherein the act of determining includes:
identifying, as a nearest neighbor point, the one of the points in the point cloud that is closest to the target location according to a distance metric;
detecting whether the nearest neighbor point is within a threshold distance of the target location according to the distance metric;
in the event that the nearest neighbor point is within the threshold distance, assigning, as the target attribute value, the attribute value that is associated with the nearest neighbor point; and
in the event that the nearest neighbor point is not within the threshold distance, assigning, as the target attribute value, a default value.

34. The method of claim 32 wherein the distance metric is a Euclidean distance in the 3-D space.

35. The method of claim 32 wherein the target location and each of the points in the point cloud (Original) has a surface normal associated therewith and wherein the distance metric is based at least in part on a degree of similarity of the respective surface normals of the target location and the point in the point cloud.

36. The method of claim 28 wherein providing the point cloud includes providing the point cloud as a data structure that facilitates efficient lookup using 3-D cordinates.

37. The method of claim 36 wherein the data structure is a k-D tree.

38. The method of claim 28 further comprising:
rendering an image using the target geometric model and the target texture map.

39. The method of claim 38 further comprising:
storing the image on a storage medium.

40. The method of claim 39 wherein the storage medium comprises film.

41. The method of claim 39 wherein the storage medium comprises a computer-readable storage medium that stores a digital representation of the image.

* * * * *